Nov. 3, 1942.    J. A. ROOK ET AL    2,300,811
DIRECTION SIGNAL SWITCH
Filed Jan. 21, 1939    3 Sheets-Sheet 1
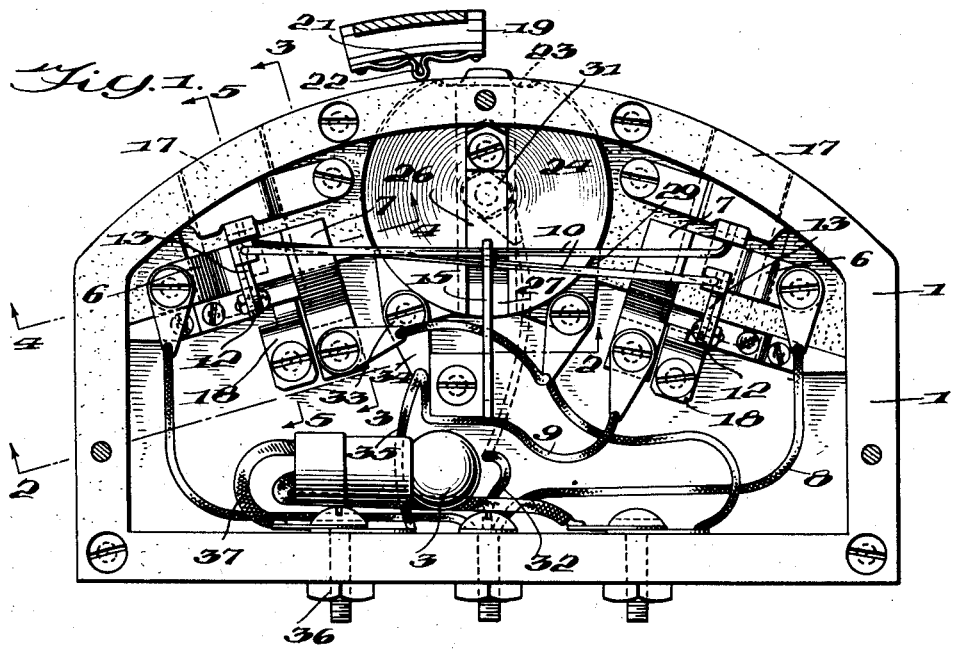
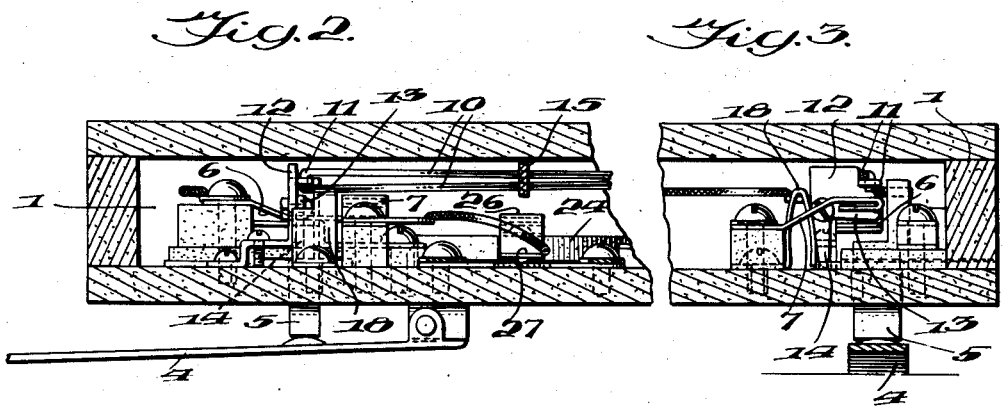
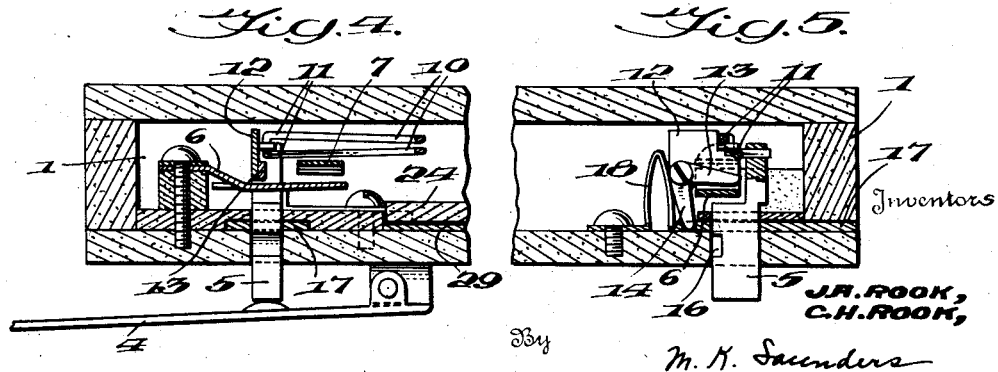
Inventors
J.A. ROOK,
C.H. ROOK,
By M. K. Saunders
Attorney Nov. 3, 1942.　　　J. A. ROOK ET AL　　　2,300,811
DIRECTION SIGNAL SWITCH
Filed Jan. 21, 1939　　　3 Sheets-Sheet 3

Inventors
J. A. ROOK,
C. H. ROOK,
By M. K. Saunders
Attorney

Patented Nov. 3, 1942

2,300,811

UNITED STATES PATENT OFFICE 2,300,811

DIRECTION SIGNAL SWITCH

James A. Rook and Clay H. Rook, Los Angeles, Calif.

Application January 21, 1939, Serial No. 252,198

6 Claims. (Cl. 200—59)

This invention relates to manually and automatically controlled directional signals for automobiles and the like and the object of the invention is to provide such a signal with means which will prevent the operation of more than one signal at a time.

Another object of the invention is to provide a manually and automatically controlled directional signal for automobiles and the like wherein operation of the vehicle in one direction will automatically cut off a previously given signal in the opposite direction.

Another object of the invention is to provide a manually and automatically controlled directional signal means for automobiles and the like wherein the manually controlled means for a signal in one direction will be released when the automatically controlled means for the same signal is operated.

Another object of the invention is to provide a manually controlled directional signal for an automobile or the like wherein a manually given signal will be cut off when the signal for the opposite direction is given.

Another object of the invention is to provide a directional signal for automobiles and the like which is automatically controlled by the steering gear for the automobile.

We accomplish the above, and other objects of the invention which will be apparent as the description proceeds, by means of the construction shown in the accompanying drawings, in which—

Fig. 1 is a front elevation of the device constituting our invention with the cover to the casing removed;

Fig. 2 is a horizontal section on the line 2—2 of Fig. 1;

Fig. 3 is a vertical section on the line 3—3 of Fig. 1;

Fig. 4 is a horizontal section on the line 4—4 of Fig. 1;

Fig. 5 is a horizontal section on the line 5—5 of Fig. 1;

Figure 6:
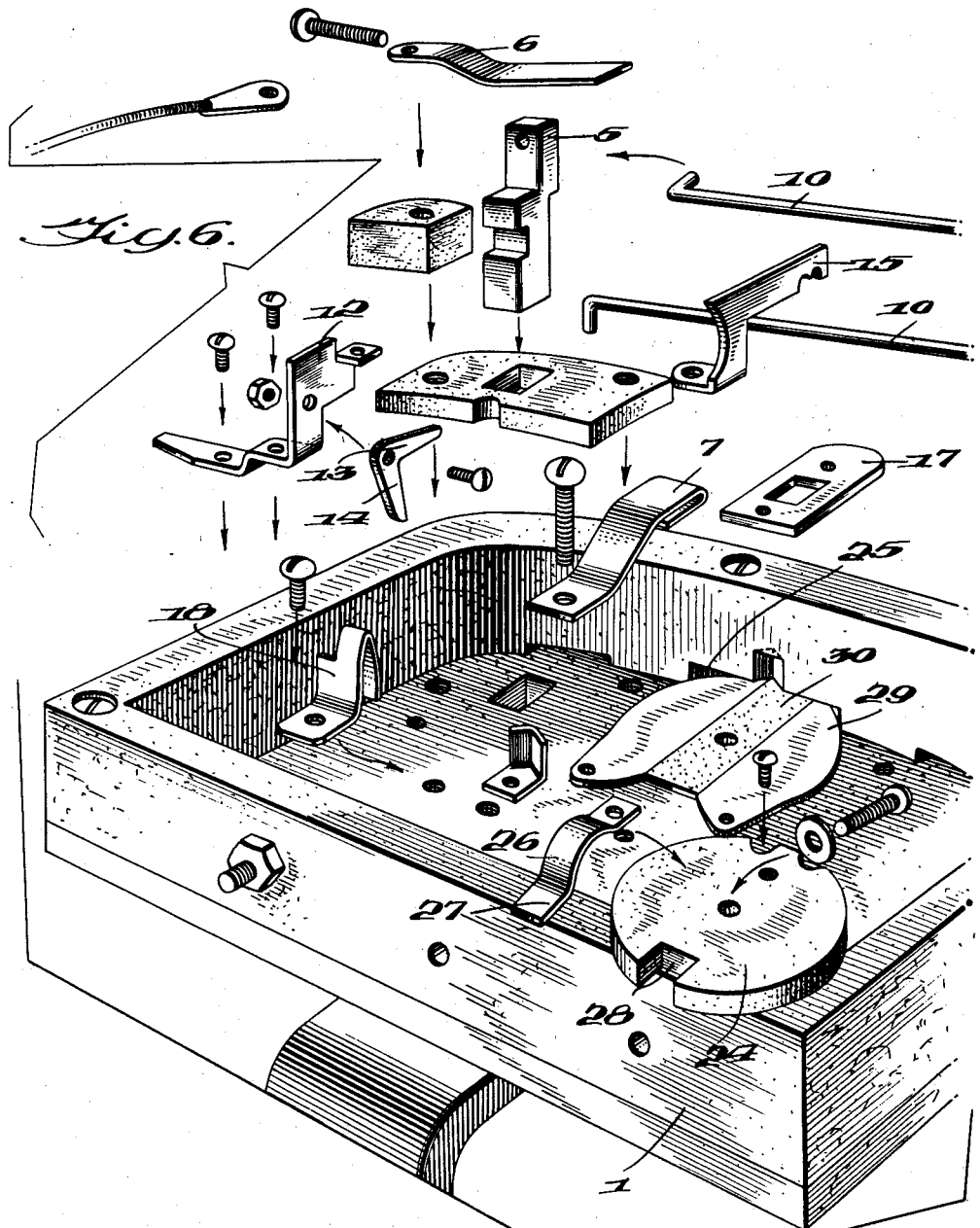
Fig. 6 is an exploded view of the interior left hand side of the device, a portion of the casing being shown in perspective.

On the drawings, in which like reference characters indicate like parts on all the views thereof, I indicates a casing adapted to be secured to the steering wheel column 2 of an automobile within convenient reach of the operator, there being a pilot light 3 within the casing for the operator's observation. Pivotally mounted on the exterior of the casing are the manual switch operating lever arms 4 for the right and left hand signals.

Since the operating elements for the right and left signals are substantial duplicates of each other, only one set of operating elements will be described, that of the manually and automatically controlled left hand set being selected for description.

Figure 7:
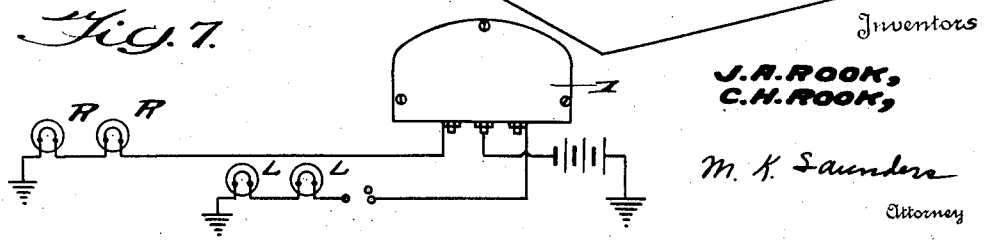
Fig. 7 is a diagrammatic view of the electric system including the device constituting our invention.

The manually controlled signal consists of the lever arm 4 which is positioned to engage the pushbutton 5 slidably mounted and extending into the casing to bear against the spring contact 6, thus urging it into contact with the spring contact 7, both of which contacts are secured in the casing. The circuit to the pilot light 3 and the respetcive right and left signals is through the lead wires, 8, 9 and other elements which will be later referred to, and through the wire 8 to the ground outside the casing, as shown in the diagrammatic view of Fig. 7. While we prefer to locate our signal control and directional lights in the ignition system of the automobile, it is apparent that they might be in an independent system with a separate battery to supply the current, if desired.

Loosely mounted on each of the pushbuttons 5 within the casing is one end of a lever rod that on the right hand side, for example, extending across the casing and terminating in a bent end 11 which extends through an opening in the mounting 12 which also supports a bell crank lever having arms 13 and 14, the arm 13 being normally positioned above the spring contact 6. The purpose of the lever arms and their connections is to ensure that when one signal has been made manually, the operation of the pushbutton for the other signal in the opposite direction will automatically open the circuit to the first signal. Assuming that the signal circuit on the left hand side has been closed by the operation of the left pushbutton and the contacts 6 and 7 are in engagement with each other, operation of the pushbutton 5 on the right side will carry the end of the lever 10 supported by it therewith while the left hand end of the lever will be moved in the opposite direction so that the bent end 11 will bear against the arm 13 of the bell crank lever, rocking the same on its pivot, whereupon the arm 13 engages the spring contact 6 and forces it away from the contact 7 (see Fig. 5) thus opening the circuit to the left hand signal. It is thus apparent that it will be impossible for the manually operated means for the circuits on both the right and left hand sides to be in circuit closing position at the same time, thereby preventing the confusing situation which would rise if both signal lights were illuminated at the same time.

A bracket 15 is mounted centrally in the casing and is provided with notches in which are seated the central portions of the two lever rods 10 thereby providing pivotal points for the lever rods.

The pushbutton 5 is provided with a locking recess 16 which is adapted to be engaged by a sliding plate 17 which is actuated by a spring 18 secured in the casing which urges the plate outwardly to enter the recess. The arm 14 of the bell crank lever is positioned in a slot in the sliding plate 17 and functions to withdraw the sliding plate from the recess in the pushbutton to permit the latter to return to its inoperative position. This occurs when the bell crank lever is rocked on its pivot by the end 11 of the lever rod 10, as above described. The spring contacts 6 and 7 are thus held in engagement with each other until they are forced away from each other by the lever arm 13.

The above description is of the manual operation of the directional signal but, in order that a signal may be given even though the operator has failed to operate the manual switch, automatic means are provided for closing the signal circuits when the steering wheel is rotated to make a turn. This switch closing means consists of a bracket 19 on the spoke 20 of the steering wheel which turns therewith, the bracket being provided with an outwardly bent spring arm 22 which is positioned to engage in one of the notches 23 of a plate 24 mounted for rotation in the casing, the casing being cut away, as at 25, so that the periphery of the rotating plate may be engaged by the spring arm 22.

Secured to the rotating plate 24 to rotate therewith is the spring contact 26 having an end portion 27 seated in the cut out portion 28 of the plate. Secured to the casing beneath the plate 24 and in frictional engagement therewith is a conductive plate 29 having a central insulated portion 30. When the rotating plate 24 is in neutral position, the end 27 of the contact arm 26 will rest on the insulated portion 30 of the fixed plate and the circuits to both the right and left hand signals will be open. When, however, the plate is rotated in a clockwise direction by the bracket moving to the right, the spring contact 26 will bear against the conductive left hand side of the fixed plate 29 and the circuit will be closed through the screw post 31, and lead wire 32 to the ground, and through the screw post 33, conductive arm 34 and lead wire 35 to the binding post 36 and from there to the right signal light. The posts 31 and 33 are in conductive relation with the plate 29. As will be seen, the lead wire 8 of the manually controlled circuit is electrically connected through lead wire 35 with the binding post 36, while the pilot light 3 is electrically connected through the wire 37 with the post 36.

Figure 8:
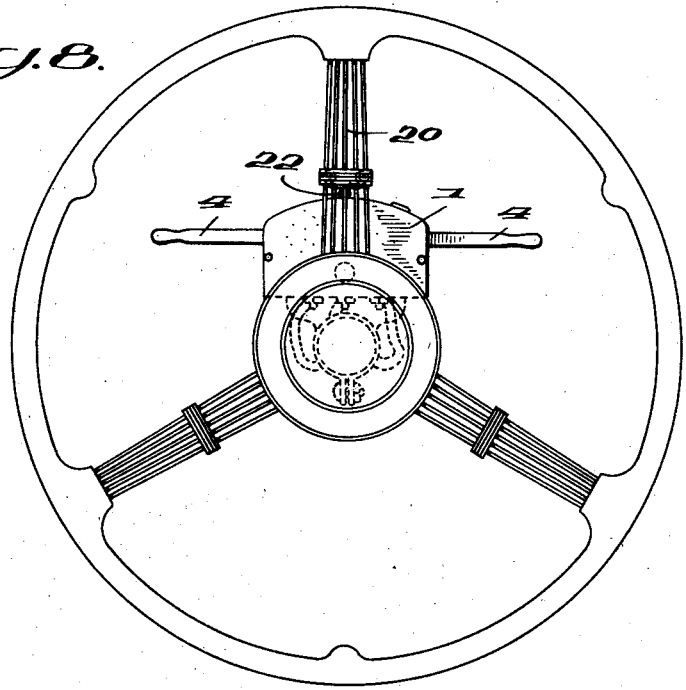
Fig. 8 is a top plan of an automobile steering wheel showing our invention in cooperative relation therewith.
Figure 9:
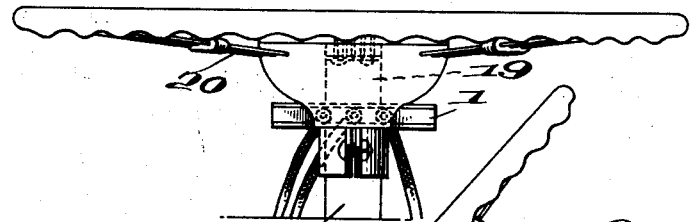
Fig. 9 is a view at right angles to Fig. 8.
Figure 10:
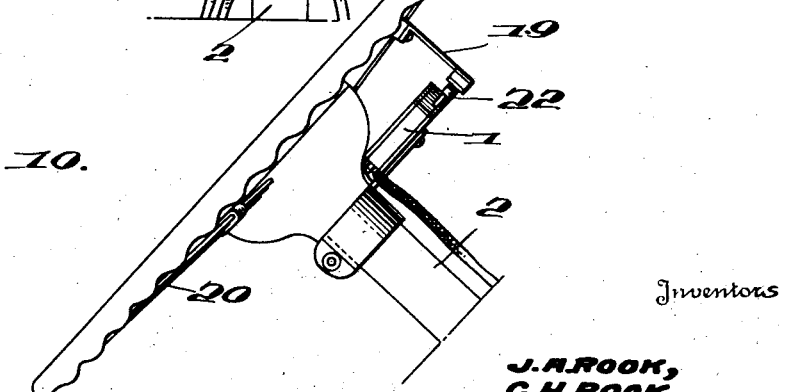
Fig. 10 is a side elevation of the construction shown in Fig. 8.

The automatic operation of the device just described will also function to cut out a manually given signal should the automobile actually be turned in the opposite direction from that indicated by the signal, as will now be described. In practice, the bracket 19 is secured to the spoke arm of the steering wheel which is in lowermost position, or what constitutes the stem of the Y when the wheel is in straight ahead driving position, so that when a manual signal is given for a turn in one direction and the turn is actually made in the opposite direction, the spring arm 22 will cut off the first made signal automatically before it reaches the rotating plate 24 to complete the automatic signal. Referring to Fig. 8, let it be assumed that the left hand manual signal has been operated and the turn has then been made in the opposite or right hand direction, the spoke 20 will have been carried in a clockwise direction and the spring arm 22 of the bracket will engage the sliding plate 17 on the left hand side and disengage it from its pushbutton 5 whereupon the signal to the left will be cut off. Further movement of the steering wheel brings the spring arm into engagement with the rotating plate 24, as shown in Fig. 8, and the circuit to the right hand signal is closed.

It will thus be seen that the signal given for one direction will be automatically cut off if the turn is made in the opposite direction. Should it be desired to have this automatic cut-off take place in a shorter time than is required to carry the bracket arm on the lowermost, or stem of the Y forming the spoke arms, into engagement with the sliding plates 17, two brackets might be provided on the spoke arms constituting the upper or arms of the Y, so that the movement of the wheel to the right would carry the left spoke arm and bracket over the left hand sliding plate and, likewise, turning of the wheel to the left would carry the right bracket and arm over the right hand sliding plate 17 to cut off the right signal. Since such a construction is obvious no illustration of the same is deemed necessary.

Since the operation of our improved manually and automatically controlled signal has been embodied in the detailed description thereof, further description is unnecessary.

Having thus described our invention, what we claim as new and desire to secure by Letters Patent is:

1. In a vehicle directional signal, two sets of contacts, a pushbutton for closing each of said contact sets, and means whereby the operation of one of said pushbuttons to close its contacts will open the contacts controlled by the other pushbutton, said last named means comprising a lever arm adjacent each set of contacts for opening the same and a pair of lever rods, each of said lever rods being mounted at one end on a pushbutton and having its other end positioned in operative relation to the lever arm for the other set of contacts.

2. The construction as defined in claim 1 wherein means are provided for locking each of said pushbuttons in contact closing position.

3. In a vehicle directional signal, two sets of contacts, operating means for each of said sets of contacts, means for locking each of said operating means in contact closing position, and means associated with each operating means whereby the operation thereof to close its contacts will release the locking means for the other operating means and open the closed contacts.

4. The construction as defined in claim 3 wherein the last named means comprises a bell crank lever adjacent each set of contacts and its operating means, one arm of which lever releases the locking means and the other arm of which opens the contacts, and means carried by each operating means for operating the bell crank lever adjacent the other set of contacts and its operating means.

5. In a vehicle directional signal, two sets of contacts, a pushbutton for closing each of said sets of contacts, means for locking each of said pushbuttons in contact closing position, said locking means comprising a spring pressed slide, and means associated with each pushbutton whereby the operation thereof to close its contacts will release the other pushbutton from locked position and open the contacts closed thereby, said last named means comprising a bell crank lever adjacent each pushbutton and associated with the respective set of contacts and locking slide, one arm of said lever being operatively connected to the locking slide to withdraw the same from locking engagement with the pushbutton and the other lever arm opening the set of contacts, and means carried by each pushbutton for operating the bell crank lever adjacent the other pushbutton.

6. The construction as defined in claim 5 wherein the last named means comprises a lever rod loosely mounted at one end on a pushbutton and operatively associated with the bell crank lever adjacent the other pushbutton.

JAMES A. ROOK.
CLAY H. ROOK.